United States Patent
Buddhikot et al.

(10) Patent No.: US 9,161,231 B2
(45) Date of Patent: Oct. 13, 2015

(54) METHOD AND SYSTEM FOR WIRELESS NETWORKING USING COORDINATED DYNAMIC SPECTRUM ACCESS

(75) Inventors: Milind M. Buddhikot, Matawan, NJ (US); Paul Kolodzy, Centreville, VA (US); Scott C. Miller, Freehold, NJ (US)

(73) Assignee: Alcatel Lucent, Boulogne-Biliancourt (FR)

( * ) Notice: Subject to any disclaimer, the term of this patent is extended or adjusted under 35 U.S.C. 154(b) by 1014 days.

(21) Appl. No.: 11/017,997

(22) Filed: Dec. 21, 2004

(65) Prior Publication Data

US 2006/0083205 A1 Apr. 20, 2006

Related U.S. Application Data

(60) Provisional application No. 60/618,767, filed on Oct. 14, 2004.

(51) Int. Cl.
| | |
|---|---|
| *H04W 4/00* | (2009.01) |
| *H04W 16/14* | (2009.01) |
| *H04W 28/16* | (2009.01) |
| *H04W 48/08* | (2009.01) |
| *H04W 88/06* | (2009.01) |

(52) U.S. Cl.
CPC .............. *H04W 16/14* (2013.01); *H04W 28/16* (2013.01); *H04W 48/08* (2013.01); *H04W 88/06* (2013.01)

(58) Field of Classification Search
CPC ..... H04W 84/12; H04W 88/02; H04W 88/08; H04L 45/00; G06Q 10/107
USPC ........................ 709/226; 455/422.1, 450–451, 455/452.1–452.2, 453; 370/351
See application file for complete search history.

(56) References Cited

U.S. PATENT DOCUMENTS

| | | | |
|---|---|---|---|
| 6,731,620 B1* | 5/2004 | Lim et al. ................. | 370/335 |
| 7,043,225 B1* | 5/2006 | Patel et al. ................ | 455/405 |
| RE40,540 E * | 10/2008 | Sainton et al. ............ | 455/422.1 |
| 2001/0030956 A1* | 10/2001 | Chillariga et al. ......... | 370/348 |
| 2002/0084940 A1* | 7/2002 | Dettloff et al. ........... | 343/742 |
| 2003/0035388 A1* | 2/2003 | Schmidt ................... | 370/329 |
| 2003/0125039 A1* | 7/2003 | Lachtar et al. ............ | 455/453 |
| 2003/0125069 A1* | 7/2003 | Lee .......................... | 455/522 |
| 2004/0010592 A1* | 1/2004 | Carver et al. ............. | 709/226 |
| 2004/0147262 A1* | 7/2004 | Lescuyer et al. ......... | 455/434 |
| 2004/0218626 A1* | 11/2004 | Tyldesley et al. ......... | 370/464 |
| 2004/0266387 A1* | 12/2004 | Matusz .................... | 455/403 |
| 2005/0281248 A1* | 12/2005 | Aoki et al. ............... | 370/351 |
| 2006/0031082 A1* | 2/2006 | Amaitis et al. ........... | 705/1 |
| 2006/0036719 A1* | 2/2006 | Bodin et al. ............. | 709/223 |
| 2006/0160543 A1* | 7/2006 | Mashinsky ............... | 455/452.2 |
| 2007/0253361 A1* | 11/2007 | Pristas et al. ............ | 370/329 |

* cited by examiner

*Primary Examiner* — Wayne Cai
(74) *Attorney, Agent, or Firm* — Wall & Tong, LLP

(57) ABSTRACT

A method and system for coordinated dynamic access to radio spectrum for wireless networking includes defining a coordinated access band (CAB) from which radio access network (RAN) managers may request spectrum allocations in the form of time bound spectrum leases for their respective requesting base stations. In one embodiment of the present invention, a DIMSUMnet architecture is implemented to make some fundamental choices and to centralize the collection of information, such as spectral occupancy, thermal and adjacent frequency interference. Such collected information is subsequently used by a spectrum broker in making spectrum allocation decisions. The DIMSUMnet architecture of the present invention also introduces a RAN manager element to centralize the task of acquiring time bound spectrum leases and for configuring the base stations.

44 Claims, 11 Drawing Sheets

A(i) = Base station i of provider A

METHOD AND SYSTEM FOR WIRELESS NETWORKING USING COORDINATED DYNAMIC SPECTRUM ACCESS

CROSS-REFERENCE TO RELATED APPLICATIONS

This application claims benefit of U.S. Provisional Patent Application Ser. No. 60/618,767, filed Oct. 14, 2004, which is herein incorporated by reference in its entirety.

FIELD OF THE INVENTION

The present invention relates to wireless communications and, more specifically, to a method and system for dynamically managing available spectrum in wireless communications.

BACKGROUND OF THE INVENTION

In the United States, the Federal Communication Commission (FCC) sets the rules that govern access to wireless bandwidth or spectrum. These rules have lead to reservation of spectrum chunks for specific purposes. For example, the 824-849 MHz and 1.85-1.99 GHz frequency bands are reserved for licensed cellular and PCS services and require a valid FCC license, whereas the 902-928 MHz, 2.40-2.50 GHz, 5.15-5.35 GHz and 5.725-5.825 GHz frequency ranges are reserved as free-for-all unlicensed bands. This strict, long-term spectrum allocation is space and time invariant and any changes to it happen under strict FCC control.

Such static partitioning of spectrum bands has led to several problems brought to light by recent spectrum utilization measurements. More specifically, certain frequency bands, such as the cellular and PCS bands, are quite well utilized, however, a large part of allocated spectrum is highly underutilized. The utilization in several licensed bands varies dramatically over time and space. On the other hand, unlicensed bands (such as ISM, U-NII) have experienced significant interference due to uncoordinated, aggressive deployment, leading to overcrowding and poor network guarantees. Current FCC rules have left very little spectrum for allocation to new services or for the expansion of existing services, leading to an artificial spectrum scarcity, even though a large portion of usable spectrum remains underutilized. In other words, current spectrum usage is access limited rather than throughput limited.

Often times, during the peak hour operations, end users of a cellular network experience poor service due to peak usage on carrier frequencies provisioned by the service provider. During such peak loads, if the service provider can dynamically add capacity without having to statically acquire and configure the extra spectrum, it can incur significant cost savings and offer better quality-of-service to end users.

Consider a region, where a service provider X offers voice and data services using a license in cellular (A, B) or PCS (A-F) bands and a provider Y operates emergency response network in public safety bands. Often, at any given time and location, when provider X is experiencing high demands, provider Y may experience underutilization. If provider X can dynamically add spectrum from provider Y to its network to alleviate congestion events and then return the spectrum, it can result in high spectrum utilization and potentially less amount of spectrum for a given aggregate demand of two providers. Such lack of significant spatial and temporal correlation may exist to some extent even among providers operating the same types of services (voice, data) in the cellular/PCS band. Similarly, if the unlicensed bands can be expanded dynamically in time and space to increase available spectrum, network throughput and guarantees can be improved.

Recent technology trends and early policy trends indicate the feasibility of such opportunistic, statistically multiplexed, adaptive access to spectrum; often termed as the new paradigm of Dynamic Spectrum Access. These trends include, for example, Software Defined Radio (SDR), which takes advantage of advances in smart antennas, high bandwidth A/D conversion, low power amplifiers, fast digital signal processors and inexpensive reconfigurable field programmable gate arrays (FPGAs). SDRs enable on-the-fly changes to characteristics of radio such as power, modulation, waveform, and MAC and allow same hardware to be reconfigured for use in different parts of the radio spectrum. Hardware capable of tuning to any part of a large range of frequency spectrum (i.e., 5 MHz to 6 GHz) has also been demonstrated. Such spectrum sensing enables real-time measurements of spectrum occupancy and inference on underutilized portions of the spectrum. Spectrum sensing combined with SDR and policy specific functions enable the attainment of desirable frontier known as Adaptive Cognitive Radio (ACR) that adapts based on its awareness of locale and spectrum. Such a technique allows spectrum to be managed and utilized based on real-time sensing and decision-making. The regulating bodies in the USA and European Union are slowly taking measures to alter existing policy to allow networks where spectrum is dynamically managed.

SUMMARY OF THE INVENTION

The present invention addresses various deficiencies of the prior art by providing a method and system for wireless networking using coordinated dynamic spectrum access.

In one embodiment of the present invention, a method for coordinated dynamic access to radio spectrum in wireless networking includes defining a coordinated access band (CAB) of radio frequencies in the radio spectrum from which spectrum may be dynamically allocated, and allocating to a requester in response to a request, at least a portion of the CAB spectrum in the form of time bound spectrum leases. Even further, the method may include defining spectrum information channels within the CAB spectrum dedicated to providing spectrum management information, including spectrum section boundaries, a requester to which each spectrum section is allocated, a current waveform or network access method used, time duration of a lease of each allocated spectrum portion, a maximum transmission power allowed, and an interference temperature.

In an alternate embodiment of the present invention, a system for coordinated dynamic access to radio spectrum in wireless networking using radio spectrum frequencies where a coordinated access band (CAB) of radio frequencies of the radio spectrum has been defined from which spectrum may be dynamically allocated includes a plurality of base stations, a spectrum and information management (SPIM) server for managing spectrum allocation of the CAB frequencies, a radio access network (RAN) manager for negotiating a lease from the SPIM server for an appropriate amount of spectrum for a requesting base station, and a packet transport network for providing communication between the plurality of base stations, the SPIM server and the RAN manager.

BRIEF DESCRIPTION OF THE DRAWINGS

The teachings of the present invention can be readily understood by considering the following detailed description in conjunction with the accompanying drawings, in which:

FIG. 2b depicts a high level graphical diagram of spectral usage at a location for base stations of the conventional multi-provider cellular network of FIG. 2a;

To facilitate understanding, identical reference numerals have been used, where possible, to designate identical elements that are common to the figures.

DETAILED DESCRIPTION OF THE INVENTION

The present invention advantageously provides a method and system for wireless networking implementing the concept of a coordinated access band (CAB) and the dynamic allocation of the spectrum within the CAB to participating requesting clients. Although various embodiments of the present invention are described herein with respect to a DIMSUMnet network comprising a specific number of clients and base stations, the specific embodiments of the present invention should not be treated as limiting the scope of the invention. It will be appreciated by those skilled in the art and informed by the teachings of the present invention that the concepts of the present invention may be applied in many other network architectures comprising substantially any numbers of clients and base stations for the dynamic allocation of available spectrum.

The FCC Spectrum Policy Task recommends three methods to improve spectrum utilization: (1) improve access through time, frequency, and space, (2) permit flexible and controlled access to existing licensed bands, and (3) discourage inefficient use of accessed spectrum via policy rules. The inventors herein focus on the first of these three methods and disclose a managed approach that is different from the opportunistic access to entire spectrum.

More specifically, the inventors herein disclose and define a concept of Coordinated Access Band (CAB). Although the concepts of a CAB in accordance with the present invention are being described herein with respect to segmenting portions of the total radio spectrum that is under the control of the FCC, the concepts of a CAB of the present invention may be applied to a subset of the total radio spectrum under the control of a licensee. That is, a licensee of at least a portion of the FCC-controlled radio spectrum may segment and apportion a radio spectrum under the control of the licensee in accordance with the concepts of the present invention described in further detail below.

Figure 1:
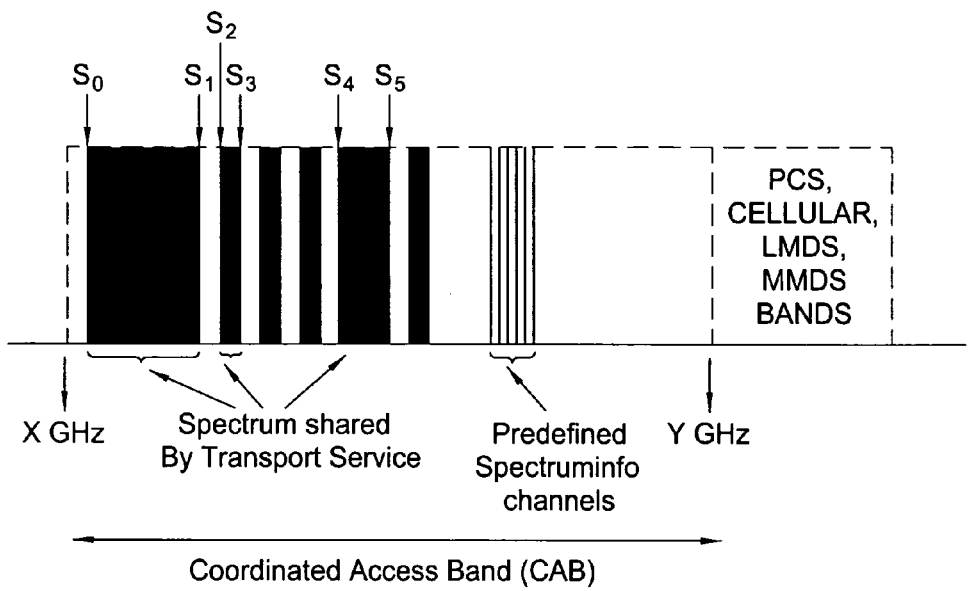
FIG. 1 depicts a high level conceptual diagram of a Coordinated Access Band (CAB) in accordance with an embodiment of the present invention.

For example, FIG. 1 depicts a high level conceptual diagram of a CAB in accordance with an embodiment of the present invention. The CAB of FIG. 1 illustratively comprises a plurality of segmented portions of the FCC-controlled radio spectrum allocated as the CAB spectrum. Within the CAB spectrum exists fixed frequency spectrum segments to be shared by an included Transport Service and various spectrum segments of fixed frequencies defined as Spectrum Information Channels (SPIC), reserved to operate a new network service, disclosed herein and defined by the inventors as a Spectrum Information and Management (SPIM) Service.

The SPIM functions to mediate the requests for dynamic access to the CAB spectrum and grants time-bound rights to any requesting entity desiring to use portions of the CAB spectrum, either in an infrastructure mode that employs cellular architecture or ad-hoc peer-to-peer mode. The CAB concept in accordance with embodiments of the present invention introduces dynamic spectrum access to the existing radio spectrum governed by the FCC. For example and as illustrated in FIG. 1, frequency bands adjacent to current cellular bands, PCS bands or unused broadcast TV channels may be designated as CAB bands in accordance with the present invention. With such a configuration, cellular providers may dynamically access spectrum from this band to add capacity to their cellular networks to meet demand surges during peak load and to relinquish extra spectrum when the network load drops. This improves cellular data and voice services and translates into cost savings for cellular providers, whom otherwise need to split existing cells into smaller cells and install new base stations.

Similarly, adding CABs adjacent to existing Local Multipoint Distribution Systems (LMDS) and Multichannel Multipoint Distribution Systems (MMDS) frequency bands enable elastic fixed wireless (point-to-point, point-to-multipoint) service with bandwidth-on-demand capabilities. Such an arrangement of the present invention helps compensate for channel impairment and load surges, and enables enhanced broadband access and backhaul services common in the fixed wireless networks. Furthermore, an advantage of co-locating the CAB with the existing cellular, LMDS, MMDS band 110 is that any changes necessary to the radio components in client and network elements may be implemented using existing technologies as the frequency range covered is typically not very large. Over time, as CAB networks and wideband radio electronics mature, increasingly larger portions of the spectrum may be converted to CAB spectrum, thus allowing gradual relaxation of static spectrum partitioning and wide spread use of dynamic spectrum access.

Figure 2A:
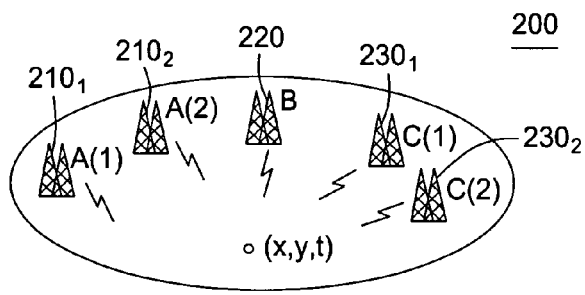
FIG. 2a depicts a high level block diagram of a conventional multi-provider cellular network.
Figure 2B:
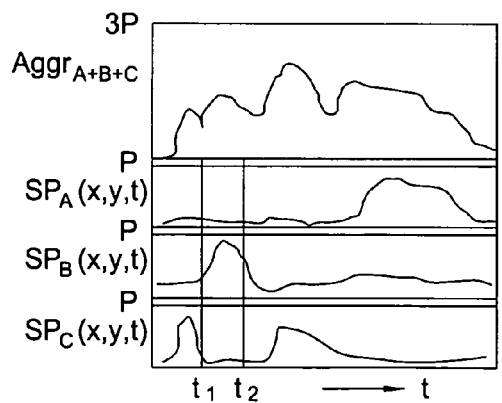

In accordance with the concepts of the present invention, the disclosed concept of CAB improves the spectrum access efficiency and fairness whereas a further disclosed concept defined by the inventors herein as Statistically Multiplexed Coordinated Access (SMCA) (defined in greater detail below) is aimed at improving the spectrum utilization in a CAB of the present invention. More specifically, classic cellular base station site provisioning provides a match between available bandwidth and the coverage area/user density product for all times of operations. Such classic provisioning performs a worst-case analysis at the individual site-level. For example, FIG. 2a depicts a high level block diagram of a conventional multi-provider cellular network 200. The cellular network 200 of FIG. 2a illustratively comprises five base stations $210_1$-$210_2$, 220 and $230_1$-$230_2$ belonging to three different service providers A, B and C, respectively. FIG. 2b graphically depicts the spectral usage at a location (x, y) for the two base stations $210_1$-$210_2$, 220 and $230_1$-$230_2$ of provider A and C, respectively, and the one base station 220 of provider B. FIG. 2b depicts the spectral usage due to individual provider signals and the aggregate usage as waveforms varying over time. As depicted in FIG. 2b, during the time period $(t_1, t_2)$, the spectral utilization of provider B peaks, whereas the providers A and C use much less spectrum. Clearly, even though the per-provider usage at (x, y) varies dramatically, a current cell-site analysis of such a network allocates a peak spectral bandwidth of P units per site. Therefore, in the cellular network 200 FIG. 2a, 3P units will be used instead of the actual instantaneous aggregate usage across all providers A, B and C.

This situation described above is analogous to using a transmission channel with a constant capacity of "R" bits per second (bps) for a variable data rate streams whose rate varies over [0 . . . R] bps. Although the site provisioning of the network 200 of FIGS. 2a and 2b optimizes the number of base stations, it actually is sub-optimal in spectral bandwidth utilization, which may be characterized according to equation one (1), which follows:

$$SpectralBW(x, y) = \sum_{NSPi} \max_{\forall BS_{NSPi}, \forall t} (SpectralBW_i(x, y, t)) \quad (1)$$

where BW stands for bandwidth and NSP stands for the number of service providers.

In the network 200 described in FIG. 2a and FIG. 2b, the most efficient use of the spectrum is to either have a single service provider use all of the available spectrum in a location or to have uniform spectral usage in space and time. However, in the network 200 of FIG. 2a, neither solution presents a viable option. In contrast, considering a network implementing an embodiment of the CAB of the present invention wherein the spectrum utilization requirements may be aggregated across multiple cells and across multiple service providers, the spectral bandwidth utilization may be characterized according to equation two (2), which follows:

$$SpectralBW(x, y) = \max_{\forall BS, t} \sum_{NSPi} (SpectralBW_i(x, y, t)) \quad (2)$$

As determinable and evident from equation two above, the most efficient use of the spectrum is to have the aggregate use at a particular region to be constant. The aggregation effect significantly reduces the required spectrum necessary for a region of space while maintaining the independence and competitive business characteristics. This mode of operation is defined by the inventors as Statistically Multiplexed Coordinated Access (SMCA) to spectrum. If a spectrum band is shared, in accordance with embodiments of the present invention, among different services such as emergency response, public safety, telemetry, cellular data and voice, each with different temporal and spatial use characteristics, the potential for statistical multiplexing gain is very high. The SMCA concepts of the present invention may be extended to all dynamic spatial footprints of base stations in dense configurations inclusive of smart antennas. Such a configuration would be closer to creating uniform usage patterns across these aggregate regions and thus a more efficient spectral use. Implementing the above concepts, a new architecture defined by the inventors as a Dynamic Intelligent Management of Spectrum for Ubiquitous Mobile-access network (DIMSUMnet) and its associated protocols are disclosed herein. A DIMSUMnet of the present invention implements the SMCA concepts of the present invention described above in a CAB band defined in accordance with the present invention.

Figure 3:
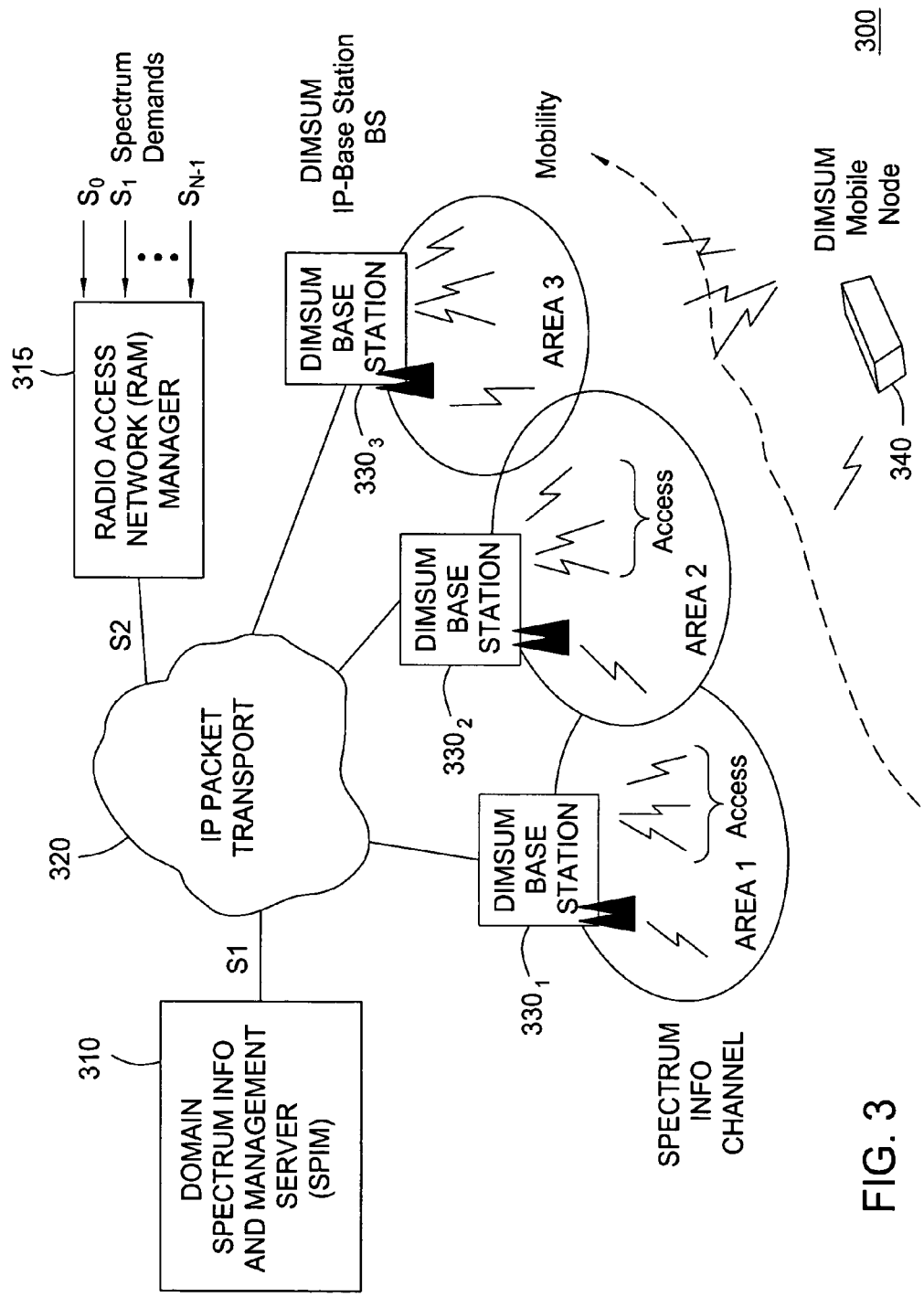
FIG. 3 depicts a high level block diagram of a DIMSUMnet in accordance with an embodiment of the present invention.

FIG. 3 depicts a high level block diagram of a DIMSUMnet in accordance with an embodiment of the present invention. The DIMSUMnet 300 of FIG. 3 illustratively comprises a Domain Spectrum Information and Management (SPIM) Server 310, a Radio Access Network (RAN) Manager 315, an IP Packet Transport network (Service Provider core network) 320, three IP-based Base-Stations $330_1$-$330_3$ (collectively base stations 330) and a client device (illustratively a mobile unit) 340.

In the DIMSUMnet 300 of FIG. 3, spectral bandwidth brokering at the individual node level provides the most aggressive form of bandwidth re-use. More specifically, in the DIMSUMnet 300 the SPIM server 310 manages the spectrum allocation in a region. That is, when a base station (BS) $330_1$-$330_4$ in the DIMSUMnet 300 boots, it registers with the RAN manager 315. The RAN manager 315 communicates with the SPIM server 310 to negotiate a lease for an appropriate amount of spectrum based on the knowledge of the capabilities of the base stations $330_1$-$330_4$. The SPIM server 310 allocates and leases a part of the CAB spectrum to the RAN manager 315. The RAN manager 315 conveys the lease to a respective one of the base stations $330_1$-$330_4$, which in turns configures its devices to offer the transport services for voice and data. The base station receiving the lease also broadcasts spectrum information snapshots to clients that use the information therein to select the transport services.

Figure 4:
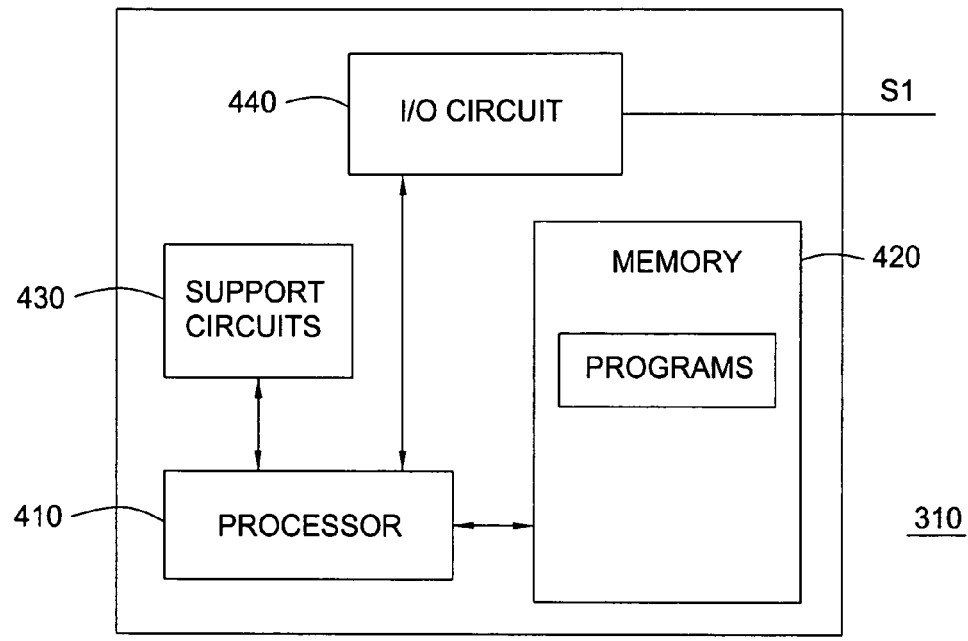
FIG. 4 depicts a high level block diagram of an embodiment of a SPIM server suitable for use in the DIMSUMnet of FIG. 3.

FIG. 4 depicts a high level block diagram of an embodiment of a SPIM server suitable for use in the DIMSUMnet 300 of FIG. 3. The SPIM server 310 of FIG. 4 comprises a processor 410 as well as a memory 420 for storing algorithms and control programs. The processor 410 cooperates with conventional support circuitry 430 such as power supplies, clock circuits, cache memory and the like as well as circuits that assist in executing the software routines stored in the memory 420. As such, it is contemplated that some of the process steps discussed herein as software processes may be implemented within hardware, for example, as circuitry that cooperates with the processor 410 to perform various steps. The SPIM server 310 also contains input-output circuitry 440 that forms an interface between the various functional elements communicating with the SPIM server 310. For example, in the embodiment of the DIMSUMnet 300 of FIG. 3, the SPIM server 310 communicates with the IP Packet Transport network 320 via a signal path S1.

Although the SPIM server 310 of FIG. 4 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

The SPIM server 310 in the DIMSUMnet 300 is a regional spectrum broker that manages spectrum rights and the propagation of information about the managed rights to any entity interested in using the CAB spectrum in a given geographical region, R. The SPIM server 310 manages all dimensions of the CAB spectrum, namely frequency, time, space (location, direction), signal (polarization, coding/modulation) and power. A main tenet of CAB spectrum usage is that any use of spectrum, either infrastructure or ad-hoc mode that is not approved by SPIM server, is a non-compliant usage. The geographical region, R, is divided to overlapping cells, CL, each of which has a coverage area, $A_{cl}$, associated with it. The cells, CL, may be further divided into micro-cells and pico-cells, which are described in further detail below. The SPIM server 310 maintains a complete topographical map of the region, R, and the approximate extent of each cell.

In one embodiment of the present invention, the SPIM server 310 maintains information regarding at least two data structures per cell: (1) SPIC-Table: a table of frequencies (carriers) and an amount of spectrum adjacent to the carrier used for SPIC and (2) a spectrum allocation map (SAM). Each SAM entry maintains information regarding various spectrum parameters such as (a) spectrum section boundaries (s0, s1) (as depicted in FIG. 2), (b) a service provider (SP) to which each spectrum section is allocated, (c) a current waveform or network access method used (e.g., GSM), (d) time duration of a lease of a spectrum portion, (e) maximum transmission power allowed, and (f) an interference temperature, which defines the amount of interference or the total RF energy from ambient, thermal noise and other sources such as secondary users, or unlicensed users with an associated timestamp.

Figure 5B:
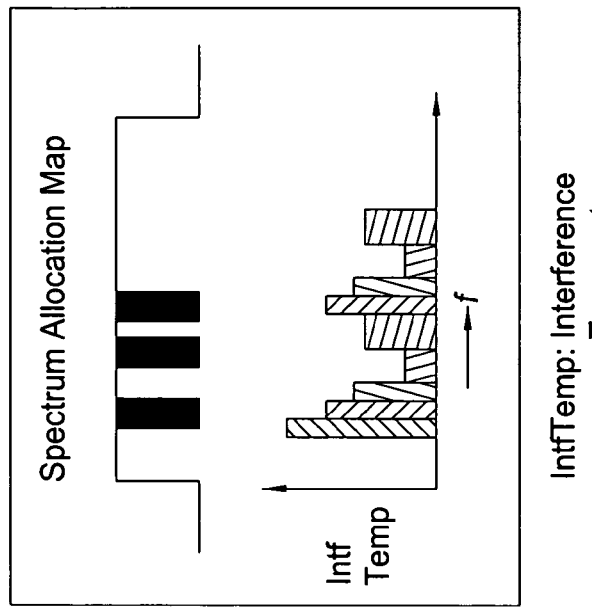
FIG. 5 depicts a high level graphical diagram of an exemplary geographical region and associated spectrum information for that region as maintained in a SPIM server for use in spectrum allocation of CAB resources in accordance with embodiments of the present invention.
Figure 5A:
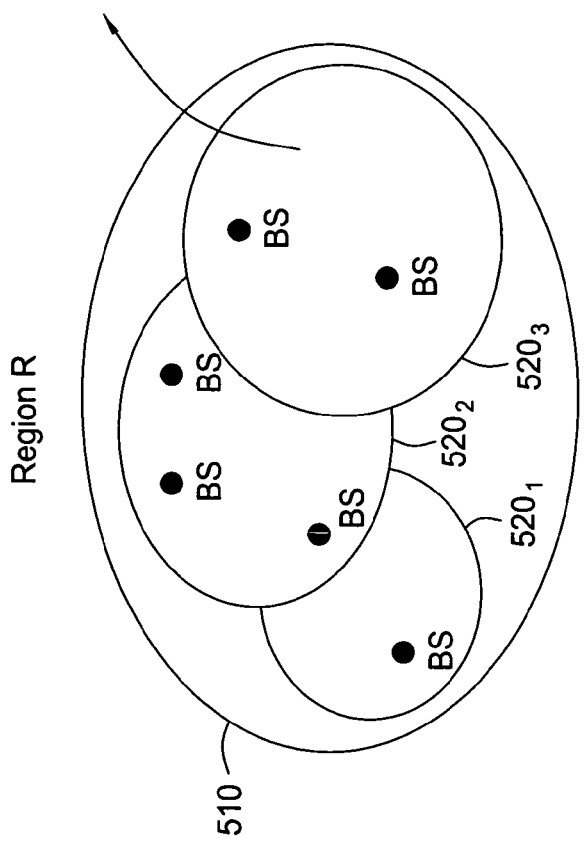

FIG. 5 depicts a high level graphical diagram of an exemplary geographical region and associated spectrum information for that region as might be maintained in the SPIM server 310 for use in spectrum allocation of CAB resources in accordance with embodiments of the present invention. In FIG. 5, a geographical region 510 comprises three microcells $520_1$-$520_3$, each including at least one base station (BS). FIG. 5 further depicts a SAM and associated interference temperatures for the spectrum of the SAM plotted as a function of frequency (f) for the spectrum of the third microcell $520_3$. A SAM table of the SPIM server 310 changes with time as the various parameters in the SAM entries change. For example, when the SPIM server 310 de-allocates a spectrum portion, the corresponding SAM entry is removed. The SPIC-Table and the SAM, together, maintain a spectrum snapshot of the CAB.

In accordance with one embodiment of the present invention, a SPIM server supports at least two protocols: (1) a Spectrum Information (SPI) protocol, used to propagate the spectrum snapshots and to communicate to the SPIM server, and (2) a Spectrum Lease (SPEL) protocol, used by network entities to obtain leasing rights for parts of the spectrum (described in greater detail below). The SPIM server may allow at least two lease holders per allotted spectrum band, for example a primary lease holder and a secondary lease holder. The primary lease holder has rights to operate at a higher power in the spectrum, whereas the secondary lease holder must operate at a lower power and ensure that the interference it generates is lower than an amount predetermined by the SPEL protocol in the SPIM server to ensure minimum interference with the primary lease holder. The SPIM server maintains a record of spectrum leases and associated interference temperatures for the associated regions. The spectrum protocol for the CAB of the present invention ensures that primary and secondary lease holders comply with the lease conditions such as power, time duration and interference and prohibits violations of the conditions. Therefore regulating bodies such as the FCC may enforce strict guidelines for operators of SPIM servers of the present invention or even operate them under their jurisdiction.

Figure 12A:
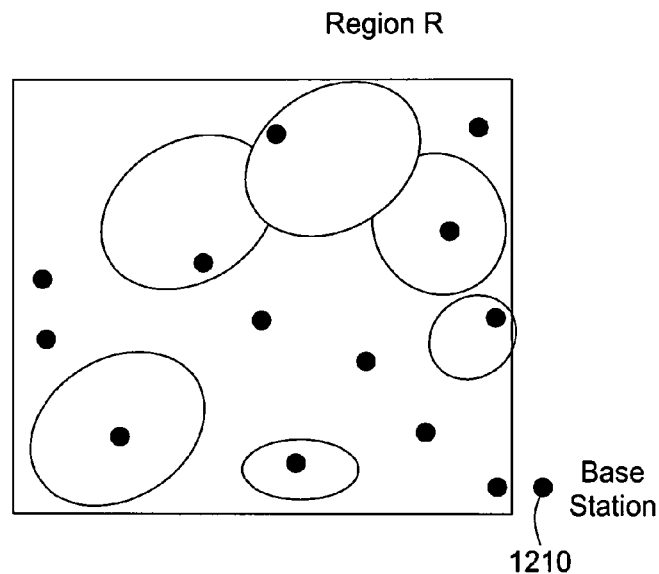
FIG. 12a depicts a high level block diagram of a square region, R, comprising multiple base stations.
Figure 12B:
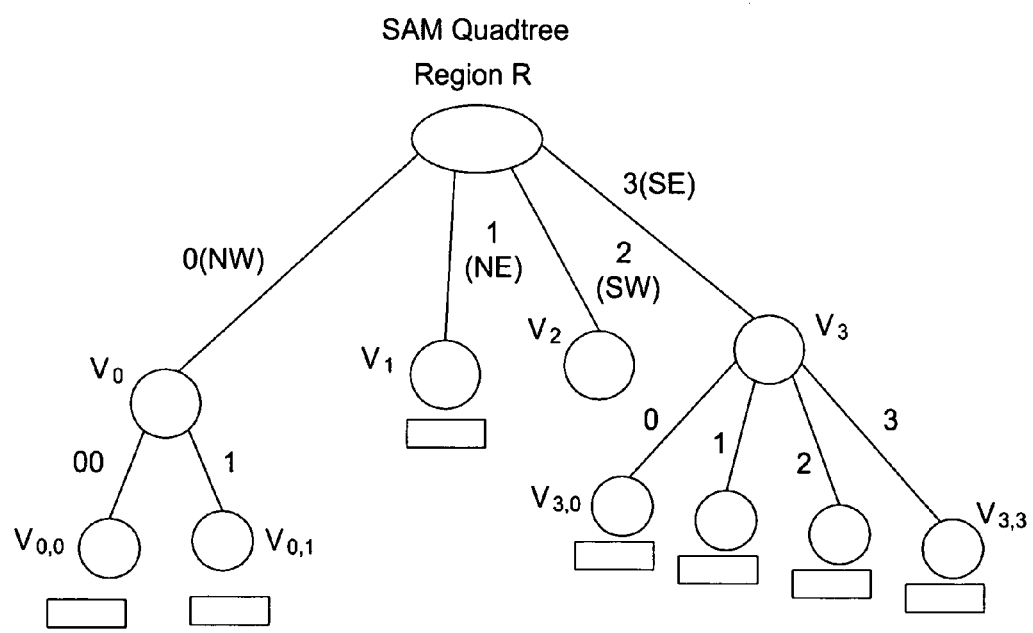
FIG. 12b depicts a high level block diagram of a SAM Quadtree in accordance with an embodiment of the present invention.

The SPIM server 310 requires data structure for scalable representation of region topography and spectrum usage that may be manipulated efficiently in the event of changes in the spectrum allocation. The inventors in one embodiment herein consider a two-dimensional representation of space and define an example data structure referred to by the inventors as a SAM Quadtree to depict this space. FIG. 12a depicts a high level block diagram of a square region, R, comprising multiple base stations 1210 depicted by points. Considering the square region, R, of FIG. 12a, each base station 1210 has an associated coverage area either measured or estimated using parameters such as power, antenna characteristics, and frequency. This coverage is represented for each frequency portion by a polygonal, circular or elliptical shape in the SAM Quadtree depicted in FIG. 12b. That is, FIG. 12b depicts a high level block diagram of a SAM Quadtree in accordance with an embodiment of the present invention. In FIG. 12b, the coverage area for each base station is represented for each frequency portion by a polygonal, circular or elliptical shape. In the SAM Quadtree of FIG. 12b, the entire region, R, is associated with the root node of the tree. The region R, is then segmented into four quadrants (V0 (NW), V1 (NE), V2 (SW), V3 (SE)) using one of the many criteria possible such as bisectors of the axes, and then represented by four children of the root node. The segmentation in this fashion continues until the entire quadrant contains all of the coverage areas and is represented by leaf nodes. Also, finer segmentation may be used for portions of topography where multiple regions overlap, which increases the data, structure size. The spectrum snapshots at the parent nodes are computed by the superposition of respective SAM tables of the children nodes. Any changes in the spectrum allocation or parameters, such as power, alter coverage and therefore spectrum snapshots at locations. These changes require changes to the respective SAM tables at multiple SAM Quadtree nodes and potentially re-computation of the SAM Quadtree segmentation.

Figure 6:
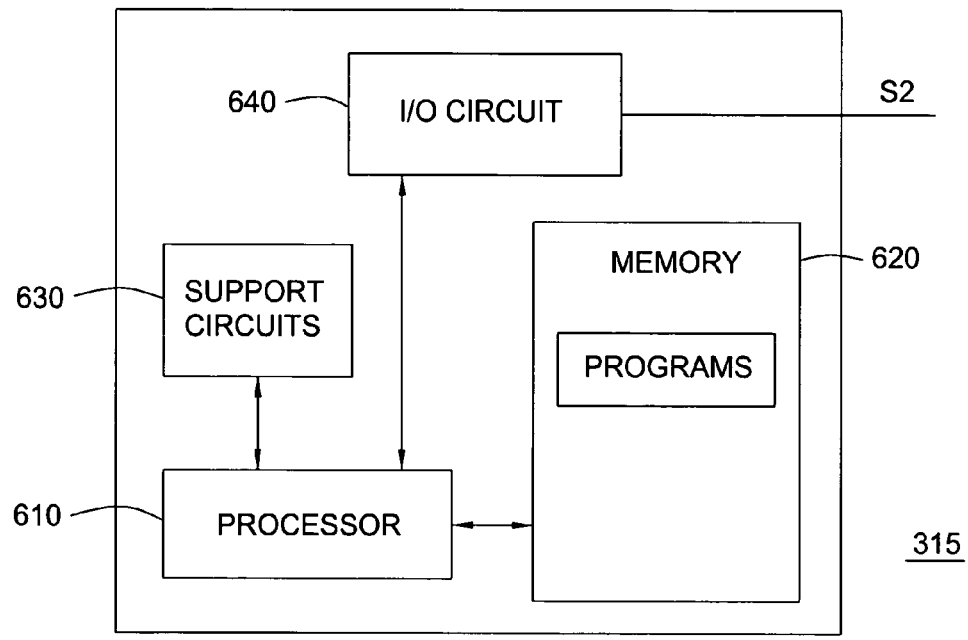
FIG. 6 depicts a high level block diagram of an embodiment of a RAN Manager suitable for use in the DIMSUMnet of FIG. 3.

FIG. 6 depicts a high level block diagram of an embodiment of a RAN Manager suitable for use in the DIMSUMnet 300 of FIG. 3. The RAN Manager 315 of FIG. 6 comprises a processor 610 as well as a memory 620 for storing algorithms and control programs. The processor 610 cooperates with conventional support circuitry 630 such as power supplies, clock circuits, cache memory and the like as well as circuits that assist in executing the software routines stored in the memory 620. As such, it is contemplated that some of the process steps discussed herein as software processes may be implemented within hardware, for example, as circuitry that cooperates with the processor 610 to perform various steps. The RAN Manager 315 also contains input-output circuitry 640 that forms an interface between the various functional elements communicating with the RAN Manager 315. For example, in the embodiment of the DIMSUMnet 300 of FIG. 3, the RAN Manager 315 communicates with the IP Packet Transport network 320 via a signal path S2.

Although the RAN Manager 315 of FIG. 6 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

The RAN Manager 315 of the present invention is capable of controlling spectrum leases for several base stations of the DIMSUMnet 300 simultaneously. The RAN Manager 315 is aware of the static characteristics of the base stations, specifically hardware and software capabilities of included Adaptive Cognitive Radios (ACRs) (not shown), such as the supported radio frequency range, signal processing and various waveform (e.g., CDMA, OFDM etc.) capabilities. The RAN Manager 315 also maintains a record of the dynamic characteristics of the base stations of the DIMSUMnet 300 such as current load, power usage, available power an the like. Based on location specific policies, base station characteristics, and geographical coverage requirements for a service provider, the RAN Manager 315 computes an amount of spectrum required to meet bandwidth demands and communicates bids to the SPIM server 310 for fulfillment of the bids. In one embodiment of present invention, the RAN Manager 315 implements the SPEL protocol to communicate to the SPIM server 310. If the spectrum leases are granted, the RAN Manager 315 sends commands to the base stations to configure their ACRs as per the service provider's specific MAC and radio protocol and thus, activates radio access channels. The RAN Manager 315 periodically renews existing leases or may alternatively terminate leases. The RAN Manager 315 is also able to negotiate new spectrum leases for various reasons such as price changes, increased interference in an existing band, or increased load reported by a base station(s).

An adaptive cognitive radio (ACR) device is a new radio design philosophy where all parameters are adaptive. Some of the properties of ACR devices include RF technology that is capable of listening to (processing) huge swaths of spectrum. ACR devices are able to maintain knowledge of a user's spectrum usage as a function of location and time. ACR devices are also capable of maintaining rules for sharing the available resources with respect to time, frequency and space. In addition, ACR devices include embedded intelligence able to determine optimal transmission (i.e., bandwidth, latency, QoS) based on a user's behavior. ACR devices maintain great promise in helping to facilitate more effective and efficient access to spectrum.

Figure 7:
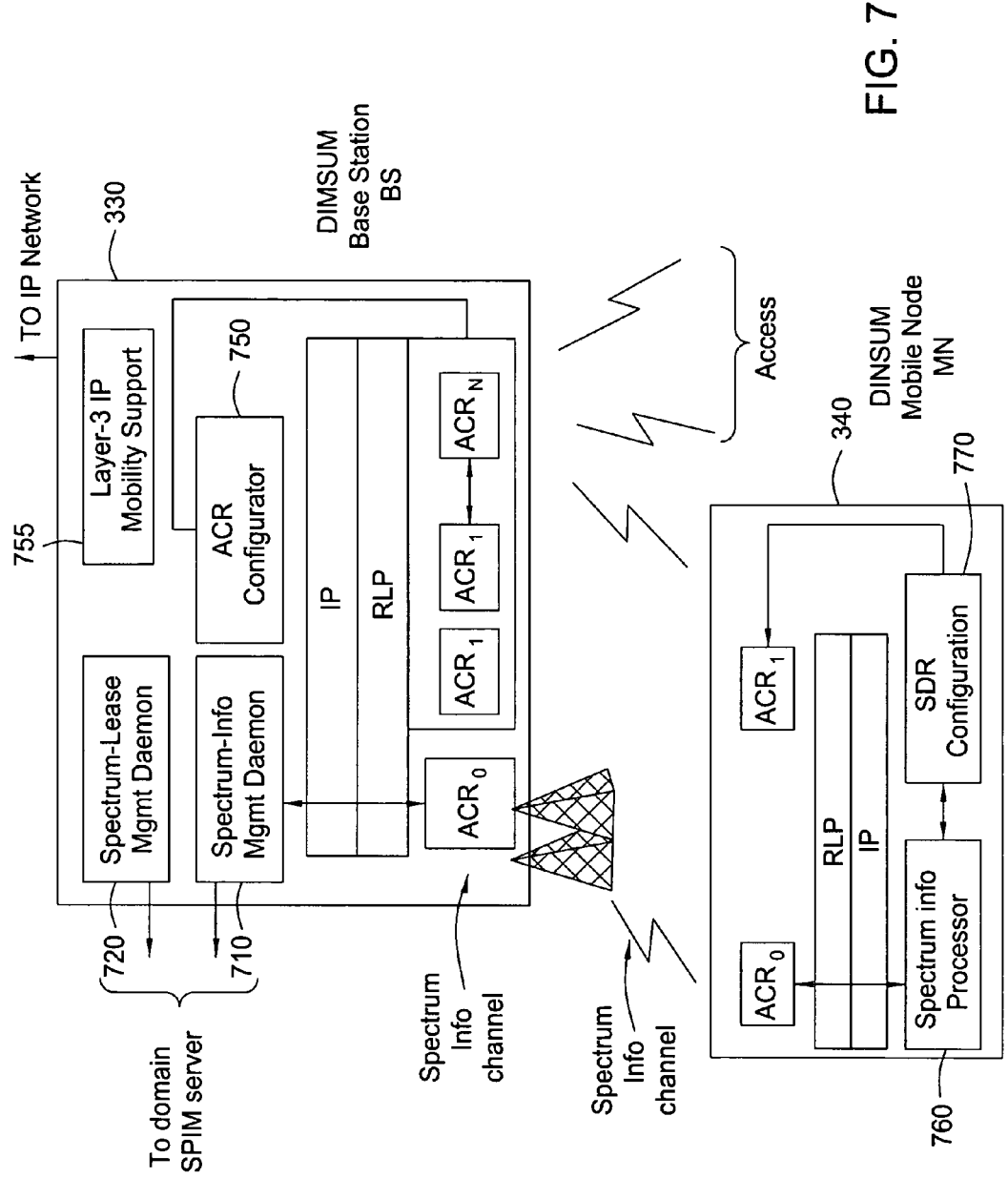
FIG. 7 depicts a high level block diagram of an embodiment of a base station and a client device suitable for use in the DIMSUMnet of FIG. 3.

FIG. 7 depicts a high level block diagram of an embodiment of a DIMSUMnet base station 330 and a DIMSUMnet client device 340 suitable for use in the DIMSUMnet 300 of FIG. 3. It should be noted that all of the base stations 330 of the DIMSUMnet 300 of FIG. 3 comprise substantially the same components and functionality and a such the base station 330 depicted in FIG. 7 should be considered as representative of each of the base stations of the DIMSUMnet 300. The base station 330 of FIG. 7 illustratively comprises multiple instances of ACRs (illustratively $ACR_0$-$ACR_N$) managed by the ACR configurator 750. A subset of the ACRs is reserved for SPIC channels and others are used to provide access channels for data and voice transport service. Each base station 330 of the DIMSUMnet 300 may be either static or mobile and using a respective one of the ACRs periodically configured as, for example, a GPS receiver, to maintain awareness of its location. The base station 330 of FIG. 7 further comprises at least two daemons related to spectrum management, namely a Spectrum-info daemon 710 and a Spectrum-lease information daemon 720. The Spectrum-info daemon 710 communicates with the domain SPIM server 310 to obtain spectrum-map snapshots relevant for its location and broadcasts it over the reserved SPIC channels. The Spectrum-info daemon 710 also records information such as the number of end-users using each portion of spectrum, per user information such as geo-location, a temporal snapshot of respective interference temperatures, and the signal-to-noise ratio for a current wireless access channel, and communicates such information to the SPIM server 310.

The Spectrum-lease information daemon 720 communicates with the RAN Manager 315 to obtain spectrum leases and commands to configure its respective ACR devices. The commands obtained from the RAN Manager 315 specify, for example, the frequency bands of the allocated spectrum, the power to be used, and the type of waveform to be used. For example, a command may specify using a maximum power of 30 watts, a carrier frequency of X=1.923 GHz, a bandwidth of B=1.25 MHz and a CDMA Direct Sequence Spread Spectrum (DSSS) waveform. If the respective ACRs are successfully configured, the Spectrum-lease information daemon 720 registers with the SPIM server 310 its use of the allocated spectrum portion and the associated previously recorded parameters.

In the event that a spectrum lease expires and the RAN Manager 315 does not send a lease renewal notification, the Spectrum-lease information daemon 720 disables the respective ACRs and notifies the SPIM server 310 of the de-allocation of spectrum portion. The Spectrum-lease information daemon 720 also notifies the Spectrum-Info daemon 710 of this event to ensure that the spectrum snapshot propagated to the end-user is appropriately reported.

In various embodiments of the present invention, a DIMSUMnet base station is an IP-aware base station and therefore implements Layer-3 (IP-layer) mobility support 755 such as Mobile IP FA and MobileNAT Anchor Node (MobileNAT-AN) protocols as depicted in FIG. 7. The DIMSUMnet base station is also able to support at least IP services such as a dynamic host configuration protocol (DHCP) relay and/or a DHCP server, RADIUS or DIAMETER authentication, authorization, accounting AAA client, network-address translation (NAT), and Quality of Service (QoS) support such as DiffServ packet marking and class-based QoS. In such embodiments, cross-layer communication and signaling from radio layers to higher layers, such as layer-3 and above, are necessary to optimize the performance of the DIMSUMnet base station.

The client device 340 of FIG. 7 illustratively comprises at least two logical instances of ACR devices (illustratively $ACR_0$-$ACR_1$), one of which is used as a control channel interface to access SPIC channels whereas the other is used as a data interface for accessing transport services. The client device 340 stores a static or location dependent dynamic database of carrier frequencies in the CAB band used for the SPIC channels. The control channel ACR scans and listens to the SPIC channels to obtain spectrum snapshots broadcast by the DIMSUMnet base stations in a respective region. The received snapshots enable a Spectrum Info Processor 760 in the client device 340 to obtain information on the availability of transport services in the different portions of the spectrum, specifications of the network providers offering these services, layer-1/2 specifications such as modulation, MAC, and other information such as current load, interference levels, and the like. Based on this information, the client's QoS needs, ACR waveform capabilities (such as TDMA, CDMA), and power and location constraints, the client device 340 decides on a part of the spectrum and transport service to use. An SDR configurator block 770 in the client device 340 then configures the data interface ACR device with appropriate radio characteristics to reflect the characteristics defined in the spectrum snapshot. The client device 340 must account for power constraints and adapt its associated ACR and spectrum selection and optional spectrum sensing capability (described below) in the event of deterioration in power budget. In addition, the client device 340 may be expandable to add new ACR devices, new criteria for spectrum selection and new spectrum sensing data collection.

It should be noted that similar concepts are used in current CDMA and GSM networks. More specifically, the client devices (phones) for these networks maintain a Preferred Roaming List (PRL), which is an ordered list of tuples such as System ID (SID), Network ID (NID) and Radio Frequency (f), where SID and NID uniquely characterize the provider base stations that use the frequency. In those networks, when a client device detects deteriorating radio signal, it consults the PRL to decide which carrier frequencies to scan to find service offered by its preferred provider or its roaming partners. The PRL list can be downloaded to a client device dynamically over the air interface using signaling channels. This concept has been successfully employed to achieve global roaming across multi-technology, multi-provider networks. However, in the current networks, the PRL seldom changes and therefore, such downloads are very infrequent.

In contrast, in the DIMSUMnet of the present invention, the spectrum snapshots may change frequently (e.g., every few minutes) due to changes in the spectrum allocation. As such, a client device must periodically monitor the SPIC channels to record changes in the spectrum snapshots. For example, a transport service that a client device is accessing may be remapped to another part of the spectrum with potentially different characteristics. In this case, the client device must detect this event and, reconfigure its data interfaces to continue its network and transport protocol connections. In alternate embodiments, the client device may also pro-actively reconfigure its data interface to respond to events such as increased interference, loss of signal, reduced service price, and data rate degradation due to, for example, congestion or mobility. During such a change, the client device must support session continuity to ensure seamless end-user functionality. The availability of the multiple ACR devices in at least the client device enables concurrent detection of spectrum snapshot changes or other detrimental events and the reconfiguration of data interfaces. The client device of a DIMSUMnet of the present invention may also optionally comprise a spectrum-sensing component, which periodically measures observed power spectral density in a broad range of CAB spectrum or in frequency bands adjacent to a current carrier frequency. Also, in the spectrum band that it uses for data interface, the client device may collect data on interference temperature at the location of the client device. In such an embodiment, the client device communicates both, the collected data and their aggregates, periodically to a respective base station via the SPIC channels. The use of such information for intelligent spectrum allocation is described below.

In existing cellular networks, large providers (e.g., Verizon) license spectrum from the FCC to deploy their radio access networks and sell voice and data services to end-users. However, cellular networks based upon such models require large capital investments and therefore, have led to a non-competitive environment that stifles innovation and the introduction of new technologies and services. A new form of Mobile Virtual Network Operators (MVNO) (e.g.: Virgin Mobile) that do not own any spectrum or infrastructure but that offer services by leasing services from large providers are becoming popular. However, the growth of such networks is still controlled by the primary providers.

The DIMSUMnet of the present invention, such as the DIMSUMnet 300 of FIG. 3, enables new deployment models such as a shared base station model and a nonshared base station model, which are capable of creating new types of providers. Common to both these models are the regional or national spectrum-providers that operate the SPIM server 310 and services.

However, more specifically, in the Shared base station model, a new form of infrastructure provider, defined by the inventors as the RAN providers, own and operate the base stations and the RAN Manager 315 but do not own any spectrum. Instead, the providers of the Shared base station model lease CAB spectrum from the spectrum-providers as needed. The transport service providers that offer voice and data services to end-users are the clients of the RAN providers. For example, the FCC-spectrum-borker.nj.gov may function as a spectrum broker network in New Jersey which has three RAN provider clients, namely central-nj.ran.com, northnj.ran.com, and sounth-nj.ran.com which own and operate radio access networks in the CAB band in northern, central and southern regions of the state of New Jersey. The existing cellular providers such as Verizon are clients of these RAN providers and are essentially Mobile Virtual Network Operators (MVNOs) in the CAB spectrum.

If multiple RAN providers operate in a region, a transport service provider may use one or more of the MVNOs to offer its services and provide additional service resiliency. This however requires that the RAN providers bid and use non-overlapping frequencies for the same service. In this case, the same transport service will be available in different parts of the spectrum increasing the potential for spectrum utilization and per-user data rates. This approach also requires mechanisms and policies for appropriate allocation and isolation of base-station resources such as the ACR devices of the base stations, power budget for radio amplifiers, IP backhaul bandwidth, and the transmit power used for each service provider.

In the Non-shared base station model, the provider that offers the transport service also owns and operates the base stations and leases the spectrum required to operate the service. Therefore, each service provider has its own RAN Manager and base stations. This model differs from the current cellular model in that a provider does not statically own any spectrum but leases spectrum dynamically. Offering redundant physical coverage in this model requires the provider to deploy multiple base stations in the same area and therefore this solution may be capital intensive. In both of the models, the current cellular providers may continue to hold their existing cellular and PCS band licenses (base licenses) and to use their existing infrastructure much in the same way. Any new capacity the providers add in the CAB bands on-demand is accessible to the client devices via the PRL updates in the spectrum snapshots.

As previously disclosed, a SPIM server of a DIMSUMnet of the present invention supports at least two protocols: (1) a Spectrum Lease (SPEL) protocol, used by network entities to obtain leasing rights for parts of the spectrum, and (2) a Spectrum Information (SPI) protocol, used to propagate the spectrum snapshots and to communicate to the SPIM server.

Figure 8:
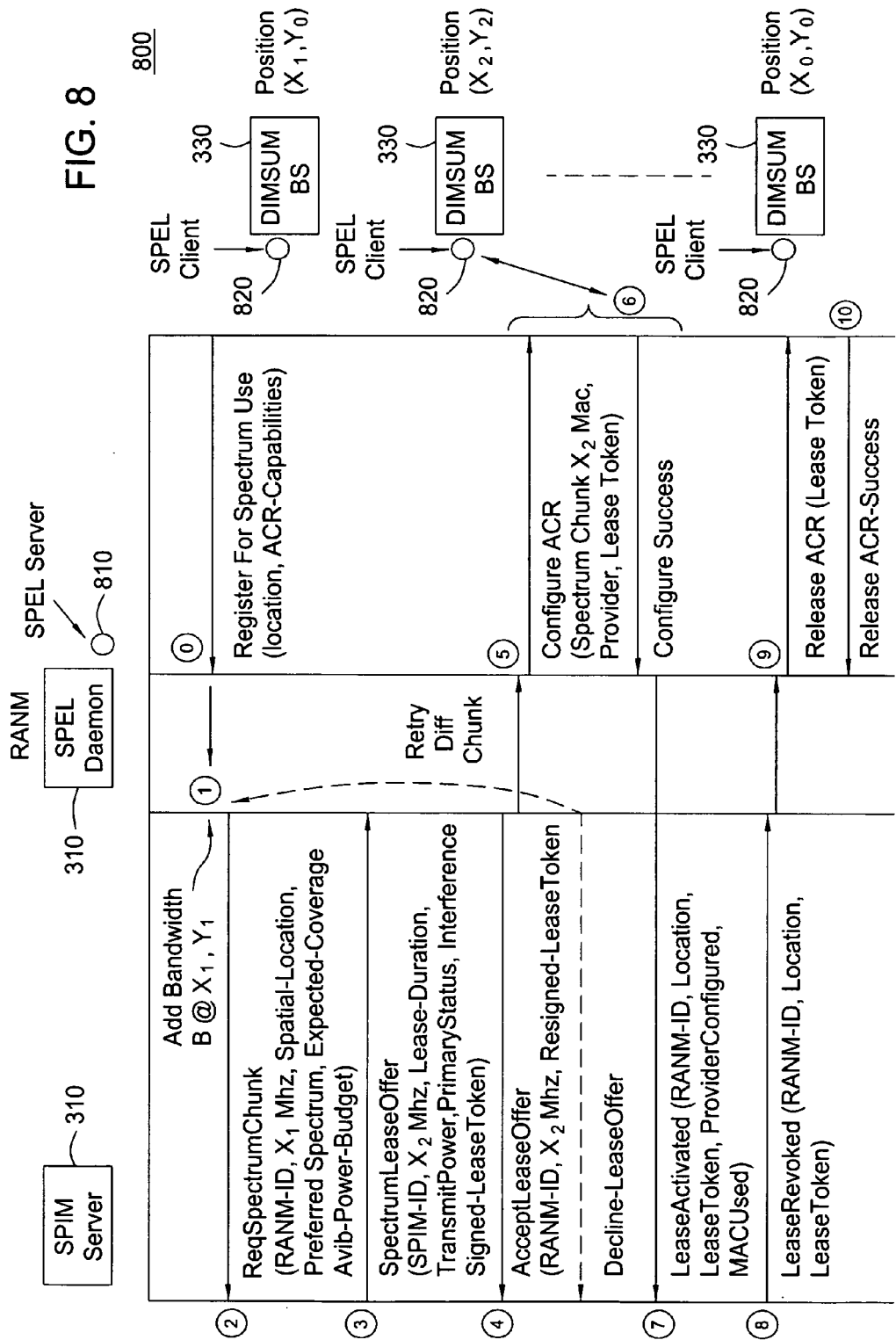
FIG. 8 depicts a high level skeleton diagram of an embodiment of a Spectrum Lease (SPEL) Protocol suitable for use in the DIMSUMnet of FIG. 3.

FIG. 8 depicts a high level skeleton diagram of an embodiment of a Spectrum Lease (SPEL) Protocol suitable for use in a DIMSUMnet, such as the DIMSUMnet 300 of FIG. 3, of the present invention. The SPEL protocol 800 illustrated in FIG. 8 functionally correlates with three entities, namely the SPIM server 310, a SPEL protocol server 810 in the RAN Manager 315 and a SPEL client 820 in a base station 330 of the DIMSUMnet 300. The protocol exchange may take place over secure channels such as IPSEC tunnels established as a part of network provisioning. The RAN Manager 315 has a unique ID that is registered with the SPIM server 310 by an out-of-band mechanism such as FCC registration. In addition, the three entities involved in the SPEL protocol may implement a common public-private key based/certificate based method such Transport Layer Security (TLS) for digital signing and encryption to guarantee authentication, non-repudiation and security of entire messages or parts of the messages.

With respect to the SPEL protocol, when a base station of the DIMSUMnet boots, the SPEL client registers with the RAN Manager, specifying the ACR capabilities and GPS location, $L=(x, y)$, and obtains the SPIC channel frequencies (i.e., Event 0 of FIG. 8). Based on the preferred modes of operations for the ACR, including policy specifications such as time-of-day, location, service (data, voice) specific bandwidth requirements, and optionally commands from a remote Network Operations Center (NOC), the RAN Manager computes the spectrum needs for the initialized base station (Event 1 of FIG. 8). The RAN Manager then sends a request message, ReqSpectrum-Portion message (Message 2, FIG. 8), to the SPIM server with parameters such as its own ID, amount of spectrum, preferred spectrum location, mode of ownership (primary or secondary) and base station specific parameters such as spatial location, available power budget, expected coverage boundaries and the like.

The SPIM server consults its topographic data structures and associated SAM tables and other dynamic information, such as interference temperature in the region, to determine if the requested spectrum portion allocation is feasible. If the exact allocation is not possible, the SPIM server may check for alternate available spectrum possibilities. For example, if the requested parameters, such as preferred position of spectrum portion, lease duration, and requested status for a spectrum lease (e.g., a primary lease) is unable to be granted, the SPIM server may make alternate offer of available spectrum. The SPIM server sends a SpectrumLeaseOffer message (Message 3, FIG. 8) to the RAN Manager that defines the SPIM server offer. If the offered lease is acceptable, the RAN Manager sends an AcceptLeaseOffer (Message 4, FIG. 8) to the SPIM server and also, sends a ConfigureACR command (Message 5, FIG. 8) to the initializing base station informing the RAN Manager of the parameters for ACR configuration. If the base station is able to successfully activate the ACR, it sends a ConfigureSuccess message to the RAN Manager, which in turns sends a LeaseActivated message to the SPIM server. This LeaseActivated message contains valid proof (in the form of a lease token signed by the BS) that the lease was activated at the intended base station.

The SPEL protocol may optionally further support LeaseRevoke, LeaseRenew and LeaseRemap messages to terminate, renew or remap, respectively, existing spectrum leases and ReleaseACR, and ReleaseACR-Success commands to a base station to cease the use of the spectrum. The SPEL protocol payload must be designed to be extensible enough to account for most spectrum leasing scenarios and capabilities of base stations into which leases are configured.

Figure 9:
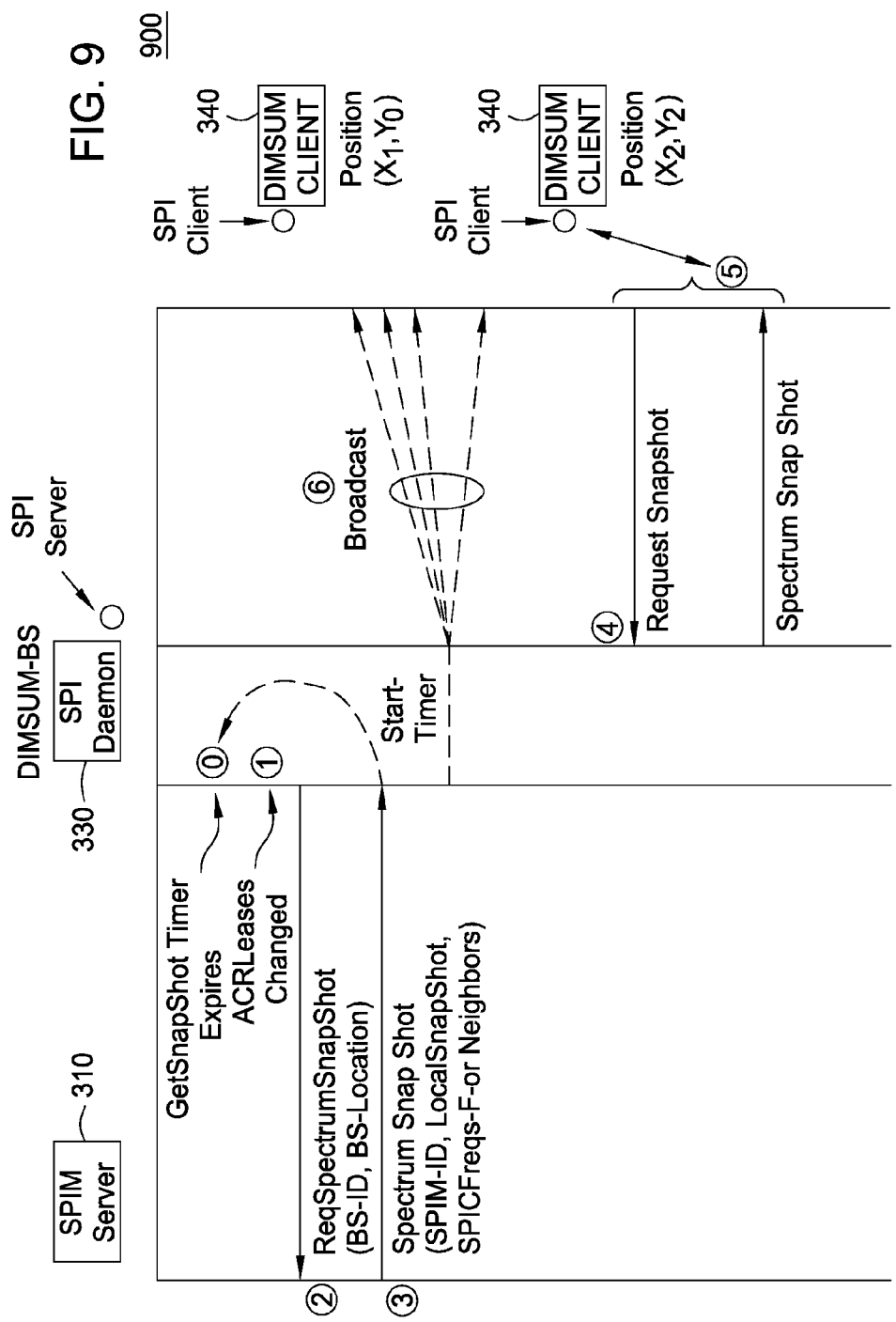
FIG. 9 depicts a high level skeleton diagram of an embodiment of a Spectrum Information (SPI) Protocol suitable for use in the DIMSUMnet of FIG. 3.

FIG. 9 depicts a a high level skeleton diagram of an embodiment of an SPI Protocol suitable for use in a DIMSUMnet, such as the DIMSUMnet 300 of FIG. 3, of the present invention. The SPI protocol 900 illustrated in FIG. 9 functionally correlates with three entities, namely the SPIM server 310, a DIMSUMnet base station 330, and the client device 340. The DIMSUMnet base station 330 periodically communicates with the SPIM server 310 to inform the SPIM server 310 of its location and lease token(s) and to obtain spectrum snapshots. Also, whenever its local ACR's are changed due to commands from RAN Manager 315, the DIMSUMnet base station 330 requests a new spectrum snapshot. Optionally and in a proactive embodiment of the SPI protocol 900, the DIMSUMnet base station 330 makes these available to clients using periodic broadcast, which is useful for low-power client devices. However, this expends the bandwidth requirement even in the absence of interested clients, especially if the broadcast period is set small to guarantee up-to-date snapshot information. A large broadcast period though saving bandwidth, may result in service disruptions due to stale snapshots or mobility.

In an alternate embodiment of a reactive SPI protocol in accordance with the present invention, clients interested in snapshots communicate probe messages to the DIMSUMnet base station 330 to initiate the communication of the relevant information from the DIMSUMnet base station 330 to an interested client. Given the sensitive nature of the provider specific information such as load, spectrum utilization, and pricing contained in the snapshots, the SPI channels may be split into secure, logical sub-channels or one-to-many multicast groups and allocated to each provider. As such, each client must be able to authenticate to the DIMSUMnet base station 330 and acquire appropriate credentials to decrypt the respective sub-channels.

It should be noted however that both protocols, the SPEL protocol and the SPI protocol, must account for strict timing constraints in obtaining a lease, configuring the lease in a base station and for propagating snapshots. The protocols must also provide reliable mechanisms for detecting violations of such timing constraints.

In an alternate embodiment of the present invention a DIMSUMnet comprises more than a single SPIM server. The redundancy in the number of SPIM servers consistently maintain the same information so that in the case that one of the SPIM servers fails, one of the remaining SPIM servers may still satisfy spectrum lease and information requests. This is considered by the inventors as SPIM Overlay.

In yet an alternate embodiment of the present invention a DIMSUMnet comprises a plurality (cluster) of SPIM servers where each SPIM server is responsible for servicing a subset of a total region, R. In such an embodiment, each subset of the region, R, may also comprise at least one redundant SPIM server or alternatively, a cluster of SPIM servers may be defined as redundant SPIM servers able to protect all of the subsets. A primary goal of this overlay design is to determine a number of servers for a given probability of the orphaning of a region in the event of a number of failures is less than a predetermined number representing the amount of protection desired. In addition, scalable mechanism such as application-layer, multicast and distributed hash tables (DHTs) may be implemented in accordance with the present invention to minimize overhead of frequent and deterministic dissemination of the spectrum snapshot information in the overlay. Furthermore, a loose interaction among SPIM servers serving overlapping regions may be implemented to minimize interference.

The spectrum allocation algorithms and policies of the present invention focus primarily on answering three critical questions: 1) How much spectrum can a provider get, if any? 2) How long can a provider hold the leased spectrum? and 3) How can a provider win a spectrum bid? At any point in time, the answers to these questions (i.e. rules of the resource allocation) are dynamic and varying over time and location. It is the responsibility of the DIMSUMnet to determine, state, update and enforce these rules as system conditions change.

Figure 10:
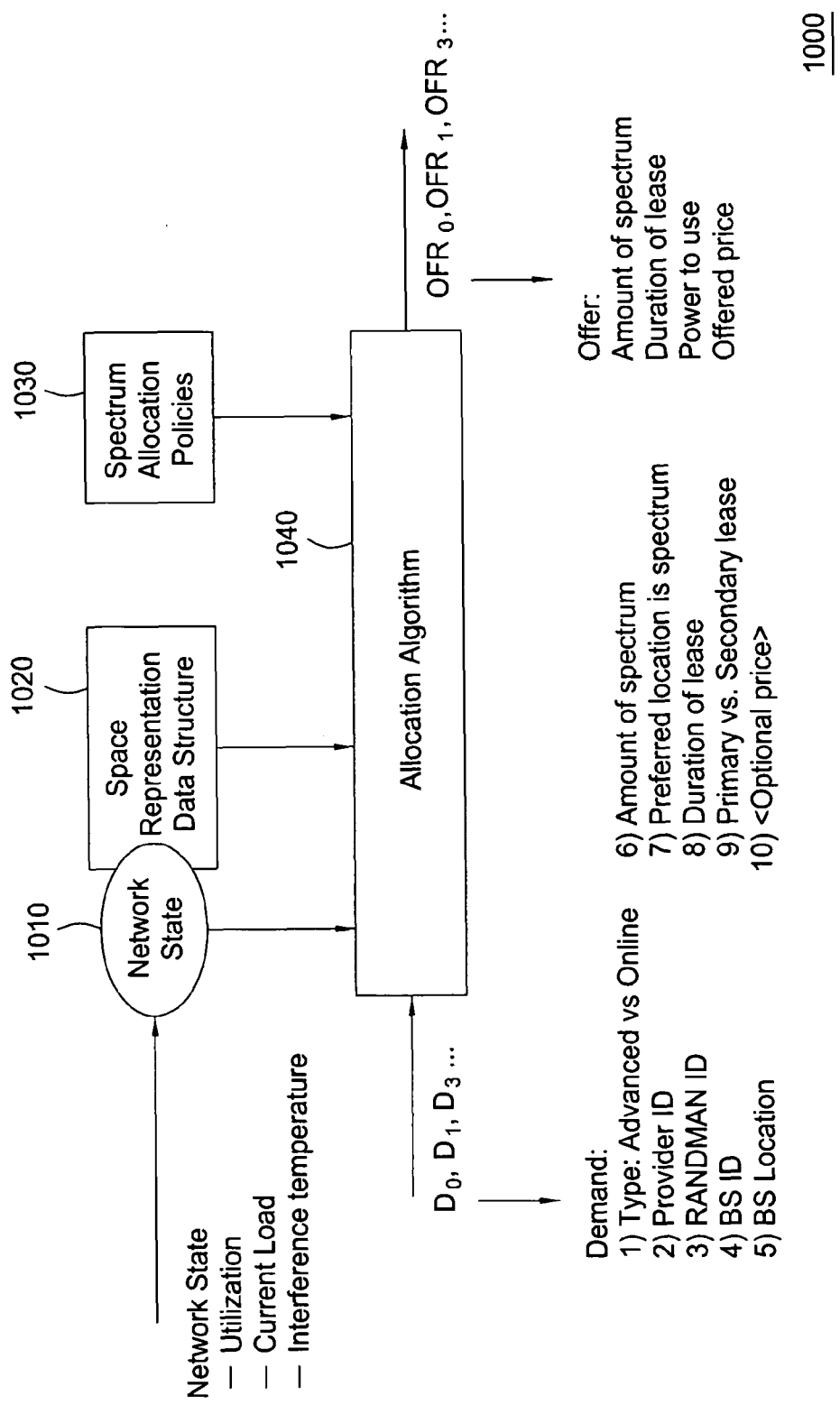
FIG. 10 depicts a high level block model of an embodiment of spectrum allocation algorithm suitable for use in the SPIM server of the DIMSUMnet of FIG. 3.

FIG. 10 depicts a high level block model of an embodiment of spectrum allocation algorithm suitable for use in a SPIM server, such as the SPIM server 310 of the DIMSUMnet 300 of FIG. 3, in accordance with an embodiment of the present invention. The spectrum allocation model 1000 of FIG. 10 illustratively comprises a Network State block 1010, a Space Representation Data Structure block 1020, a Spectrum Allocation Policies block 1030 and an Allocation Algorithm block 1040. Functionally, the Network State block 1010 receives and collects information including utilization, current load, and interference temperature, as described above, which indicates and defines the state of the network. The network state information collected by the Network State block 1010 is communicated to the Allocation Algorithm block 1040. In addition, information contained in the Space Representation Data Structure block 1020 and the Spectrum Allocation Policies block 1030 are also communicated to the Allocation Algorithm block 1040. The Allocation Algorithm block 1040 uses the received information in conjunction with information regarding a received demand for spectrum, such as the type of demand (advanced vs. online), a provider ID, a base station ID, base station location, and the requesting RAN Manager ID, to generate an offer having, for example, an allocated amount of spectrum, a duration of the lease, an amount of power to use and an offered price.

More specifically, a SPIM server receives a series of demands for spectrum at different time instances. Each demand has a type of reservation which may be characterized as either advanced, which allows a RAN Manager to reserve spectrum much in advance of the actual need for use of the spectrum, or online instantaneous, in which case the reserved spectrum is immediately used. Other relevant demand parameters are various infrastructure identifiers (e.g., BS ID, RAN Manager ID, provider ID, BS location) and lease details (e.g., amount of spectrum, spectrum location, primary vs. secondary status, duration). The output of the spectrum allocation algorithm comprises an offer that is forwarded to a requesting RAN Manager. The offer contains at least an amount of allocated spectrum, its location, an amount of maximum transmit power, duration of the lease, and a price. In one embodiment of the present invention, the offer comprises a soft state model for spectrum allocation, where each lease is for a fixed duration and after the duration expires the lease must be renewed. Furthermore, the allocation of spectrum may operate in two modes: (1) an auction mode in which each demand (bid) has an associated price and the winning bid decides the final price or (2) a merchant mode in which the price is entirely decided by the allocation algorithm. The allocation algorithm uses efficient data structures to store the topography of the region that the SPIM server is designated to serve. The allocation algorithm also maintains state information for each sub region (if any) in the region such as the spectrum allocation map (SAM), interference temperature map (ITM), network load, spectral utilization and the like. The knowledge of a client device's radio environment in a given region improves the effectiveness of the spectrum allocation process.

Figure 11:
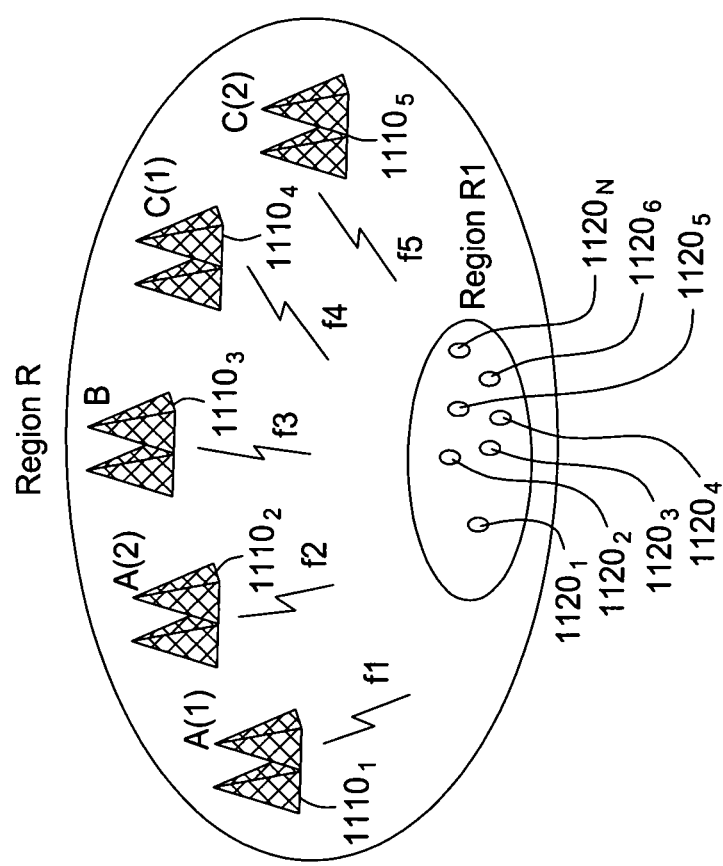
FIG. 11 depicts a high level block diagram of a region, R, comprising five base stations and a sub-region, R1, including a plurality of users.

FIG. 11 depicts a high level block diagram of a region, R, comprising five base stations $1110_1$-$1110_5$ (collectively base stations 1110), a sub-region, R1, and a plurality of users $1120_1$-$1120_N$ (collectively users 1120) in the sub-region, R1. In FIG. 11, the users 1120 in the sub-region, R1, use the services of the base stations 1120 in the region, R, which are operating in different parts of the CAB spectrum. The users 1120 therefore may experience adjacent channel interference caused by uplink transmitters using an adjacent spectrum portion. If the SPIM server allows multiple operators in the same band to operate at different power levels, significant variability in interference levels may be observed. As such and in accordance with the present invention, the users 1120 may optionally periodically collect data on the interference observed in the entire CAB or the adjacent bands of the spectrum being used and communicate the interference information back to the SPIM server via, for example, the SPI channels, such that the SPIM server is able to construct a dynamic map of radio usage and interference temperature for the region, R, and use that information for more efficient spectrum allocation. For example, if the interference in the sub-region, R1, exceeds a predetermined threshold level, the SPIM server may request a respective RAN Manager associated with the interfering base station to cause the interfering base station to reduce its transmission power, thus reducing the co-channel interference. Alternatively, a respective RAN Manager may cause the associated interfering base station to reassign a different part of the spectrum to the users in a region, such as the sub-region, R1, who are experiencing the intolerable interference.

In addition, a SPIM server may optionally implement utility pricing techniques, such as those used in current electric power markets, in its spectrum allocation. For example, in a technique known as modified price index cap, electric utility tariffs (or bids) rise with inflation (CPI), and are simultaneously forced to decrease by a pre-determined variable, which is based on each company's relative inefficiency. In the application of this approach to spectrum management, the relative efficiency of a service provider may be a dynamic variable that is based on current provider specific and total spectrum utilization.

Different policy methods may also play a role in the spectrum allocation decisions. For example, a pure CAB approach verses a partial Cab plus Cellular approach. More specifically, in a pure CAB mode of operation, the entire CAB band is dynamically allocated. This increases complexity of the client devices and signaling and potential of service disruption. However, it also increases competition and access efficiency. In a partial Cab plus Cellular approach, part of the CAB is converted to long-lived base licenses, which may also improve service quality. Therein, the providers that already hold this base license or a license in the existing cellular or PCS bands should not be given first right to dynamically shared part of CAB spectrum.

Another example may include a Cost of CAB spectrum access approach versus an owned spectrum approach. Therein, the CAB spectrum should be cheaper per time period than in the owned spectrum. A mechanism is necessary to assure that providers do not abuse the cheaper dynamic spectrum or monopolize the resources. To accomplish this, in one embodiment of the present invention, a provider must prove that it needs the spectrum when it makes a bid for the CAB band. One approach is to use periodic utilization reports from the provider for its existing leases to prove that the leases of the requesting providers are sufficiently utilized to warrant new allocations.

In addition, a spectrum lease history may be taken into account to influence spectrum allocation decisions. For example, policies need to be devised to determine if a service provider will be granted new leases (either renewal of existing lease or completely new spectrum) if a service provider is granted spectrum in a given time period. A policy needs to be devised that is able to tradeoff fair access to spectrum versus the transport service continuity. Disregarding the history and allocating the spectrum randomly may result in rapid re-mapping of transport services in different parts of the spectrum, leading to frequent service handoffs (even in the absence of end-user mobility) and in the worst case lead to service disruption. On the contrary, spectrum allocations that favor providers with already allocated spectrum reduce access fairness.

Even further, Ad-hoc spectrum allocations may be handled separately from a billing and policy standpoint. That is, if remote nodes (which are getting power control information from a base station) are to be able to communicate in a point-to-point manner while still being controlled by the base station's SPI control channel, there must be a cost associated to cover the base station's power control functions based on geo-location decisions. Clearly, the spectrum allocation algorithm must formalize the policy considerations and combine them with the mathematical formulations of network states and radio environment.

The inventors herein further contemplate the support of Micro and Pico cells as previously mentioned. More specifically, the overhead of spectrum allocation increases dramatically as the number of cells in a region increase. This scenario takes place when a region is composed of large number of micro-cells (each with a range of at least hundreds of feet) and pico-cells (each with a range of substantially tens of feet). It is unrealistic to expect the base stations in such cells to acquire spectrum leases from a remote SPIM server. Also, in most cases, these base stations are inexpensive, simple devices that support a fixed radio technology (i.e., analogous to 802.11 WLAN or Bluetooth operating in CAB band) and may not support spectrum information channels. In this case, a new entity defined by the inventors as a microSPIM is introduced. A microSPIM in accordance with one embodiment of the present invention plays a dual role. That is, a microSPIM behaves as a spectrum server and a RAN Manager for the micro and pico-cell base stations. The microSPIM server appears to the regional SPIM server as a virtual base station with abstract ACRs that operate only in certain frequency ranges at which its component micro/pico-cell base stations operate. The microSPIM server of the present invention interfaces to a regional SPIM server for acquiring spectrum to be used in the region of its component micro/pico-cell base stations. The microSPIM server obtains spectrum leases on behalf of component base stations and commands the base stations to configure their radios in certain frequencies in that spectrum. The microSPIM may also optionally collect interference data from these cells to perform appropriate frequency planning and transmit power management.

Figure 13:
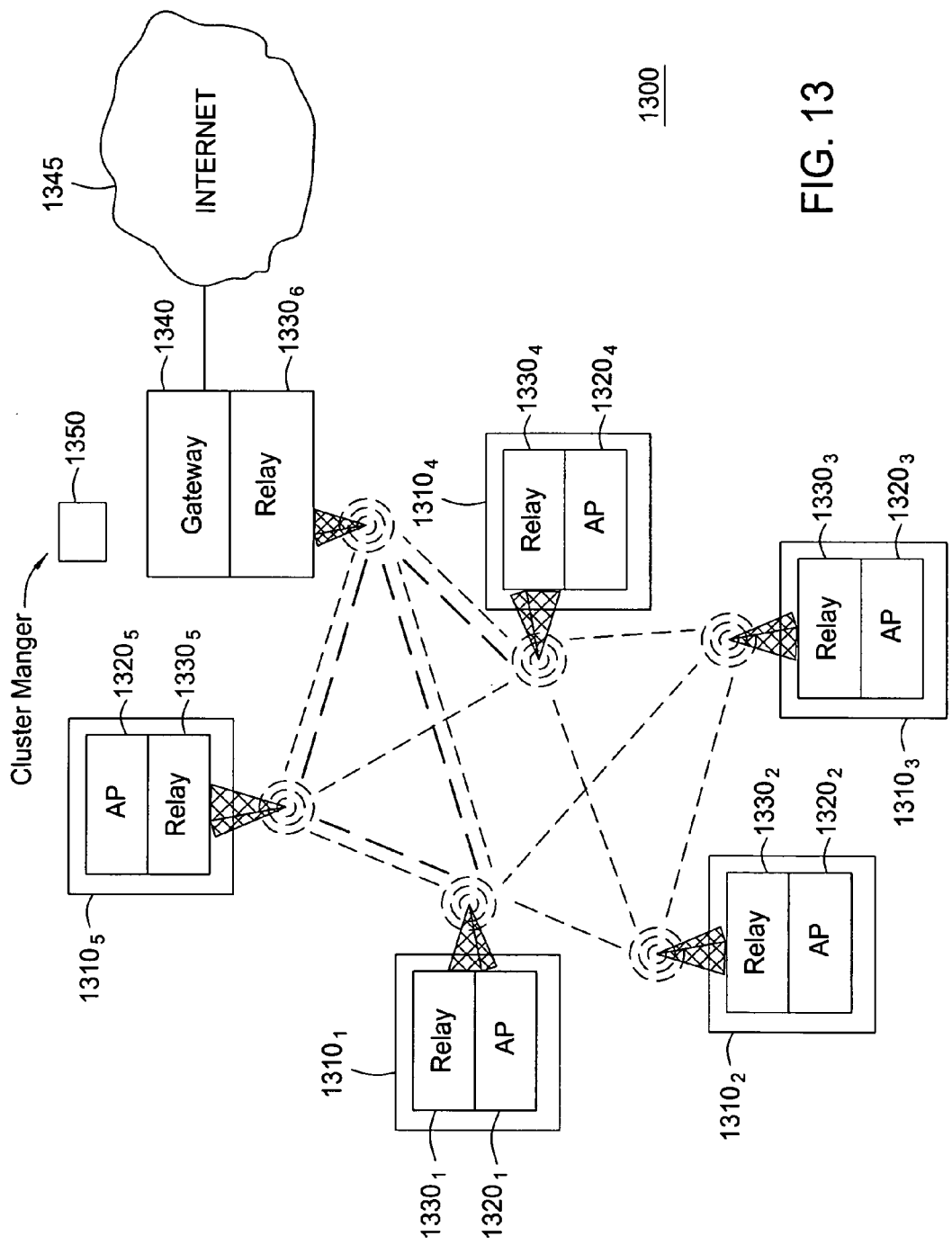
FIG. 13 depicts a high level block diagram of a DIMSUM-Relay Cluster network architecture in accordance with one embodiment of the present invention.

In an alternate embodiment of the present invention, the inventors herein present and describe the concept of a DIMSUM-Relay Cluster network architecture for making accessible the benefits of the dynamic spectrum sharing of the present invention to clients using, for example, legacy technologies such as 802.11 and 3G accesses. FIG. 13 depicts a high level block diagram of a DIMSUM-Relay Cluster network architecture in accordance with one embodiment of the present invention. The DIMSUM-Relay Cluster network 1300 of FIG. 13 illustratively comprises five base stations $1310_1$-$1310_5$ (collectively base stations 1310), a respective access point $1320_1$-$1320_5$ (collectively access points 1320) for each base station, a respective DIMSUM-Relay $1330_1$-$1330_5$ (collectively DIMSUM-relays 1330) for each base station, a DIMSUM-gateway 1340 having a respective DIMSUM-Relay $1330_6$ and an Internet 1345. Each of the DIMSUM-Relays 1330 include multiple ACR devices (not shown) which may be operated in at least two different modes, namely access interface and packet-relay interface. In the embodiment of FIG. 13, the access interfaces are configured to operate as legacy 802.11 or 3G interfaces and are used by end-user devices for network access.

In one embodiment of the present invention, the DIMSUM-gateway 1340 contains multiple ACR's which may be operated in two modes, namely packet-relay interface and uplink interface. The uplink interfaces connect the DIMSUM-gateway 1340 to the Internet 1345. It should be noted however, that although in FIG. 13 the uplinks of the DIMSUM-gateway 1340 are illustratively ACR's, in alternate embodiments of the present invention, the uplinks may be wired interfaces such as Ethernet, Packet-Over-Sonet (POS) or ATM and in that case are not ACR devices.

The packet-relay interfaces on the DIMSUM-gateway 1340 and on the DIMSUM-Relays 1330 are adaptive radio links constructed using dynamic spectrum access in the CAB spectrum in accordance with the present invention and as described above. For example, these links may be configured as 802.16 long range fixed wireless access (FWA) links operating in parts of the LMDS, MMDS bands or as short-range 802.11a/g links. These links are used to construct a self-configuring, secure, power and bandwidth adaptive multi-hop packet routing backbone that forwards end-user traffic received on access interfaces to the DIMSUM-gateway 1340. The DIMSUM-Relay Cluster network 1300 of FIG. 13 further comprises a management entity called ClusterManager 1350 either co-located with the DIMSUM-gateway 1340 or implemented as a separate element. The ClusterManager 1350 implements the RAN manager and SPIM Client functionality as described above in accordance with the present invention. The ClusterManager 1350 of DIMSUM-Relay Cluster network 1300 of FIG. 13 also implements the SPI protocol, which broadcasts the spectrum snapshots on SPIC channels on its relay interfaces. When a DIMSUM-Relay 1330 boots, it listens to the SPIC channels to discover the spectrum snapshots and the presence of relay elements in the certain parts of the CAB. For example, the snapshot may show that part of spectrum is used to operate 802.16 links (dotted lines in FIG. 13) and also provide the current network load. The DIMSUM-Relay 1330 may then configure its respective ACR(s) to those channels and using Point-to-Multipoint or Mesh mode of 802.16 to join the existing links in the relay network. In this case, the DIMSUM-Relay 1330 of the DIMSUM-gateway 1340 serves as the 802.16 base station. The DIMSUM-Relay 1330 then registers its ACR capabilities with the ClusterManager 1350 and also periodically forwards to it information such as its visible neighbors, observed network load and interference levels. The ClusterManager 1350 thus knows the complete topology of the DIMSUM-Relay Cluster network 1300 and the links used in the forwarding infrastructure.

If the ClusterManager 1350 detects that certain links are getting overloaded, based on its knowledge of relay ACRs, it may decide to configure additional links (shown as dashed lines in (FIG. 13). Specifically, it may setup additional point-to-point link between pairs of DIMSUM-Relays 1330 or alternatively configure a point-to-multipoint or mesh link among a subset of DIMSUM-Relays 1330. For this setup the ClusterManager 1350 negotiates spectrum on behalf of the DIMSUM-Relays 1330 using the SPEL protocol described above and then sends RAN manager commands to the DIMSUM-Relays 1330 to reconfigure their respective ACRs. The ability to add bandwidth-on-demand to relay infrastructure makes it possible to alleviate throughput degradations due to congestion, channel impairment and load surges. For example, under heavy load conditions when traffic in access interfaces of all included DIMSUM-Relays 1330 is high, a large amount of traffic directed to the DIMSUM-gateway 1340 creates a funneling effect where links closer to the DIMSUM-gateway 1340 experience congestion. In the DIMSUM-RelayCluster network 1300 of FIG. 13, such congestion is detected and compensated by adding capacity on links leading to the DIMSUM-gateway 1340. In the RelayCluster network 1300 of FIG. 13, the DIMSUM-gateway 1340 and the DIMSUM-Relays 1330 may employ new advanced antennas, dynamic spectrum allocation, and scheduling to improve relay throughput without affecting the client devices in the access networks. In the RelayCluster network 1300 of FIG. 13, a newly deployed DIMSUM-Relay 1330 or a DIMSUM-Relay 1330 that reboots is able to auto-discover the DIMSUM-gateway in its vicinity based on its own selection criteria such as QoS along forwarding paths, capacity of uplinks at the DIMSUM-gateway, and current load in the network. Once a DIMSUM-gateway is discovered, the DIMSUM-Relay 1330 performs a secure registration. In addition, multiple DIMSUM-Relays and DIMSUM-gateways auto-configure themselves and converge to a stable packet-forwarding infrastructure that makes appropriate QoS guarantees. Auto-configuration involves automatic spectrum and power level selection, neighbor discovery, and configuration of relay forwarding via negotiation of operational characteristics such as addressing schemes, mobility, and forwarding semantics. In the event of a failure of either a DIMSUM-Relay or a DIMSUM-gateway (due to for example, power loss, interference, and/or frequency reassignment), the RelayCluster network of the present invention reconfigures itself rapidly to avoid delay or loss of data.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A base station, comprising:
a set of adaptive cognitive radios configured to provide access channels for supporting communication services for wireless clients and configured to provide a set of spectrum information channels for sharing of spectrum information with wireless clients; and
a processor and a memory communicatively connected to the processor, the processor configured to:
receive, at the base station, configuration information determined by a radio access network manager and comprising one or more configuration parameters for configuring one or more of the adaptive cognitive radios of the base station based on a spectrum lease of radio spectrum dynamically allocated to the base station by a spectrum information management server, and configure one or more of the adaptive cognitive radios of the base station based on the received configuration information; and
receive spectrum information determined by the spectrum information management server and comprising one or more spectrum parameters describing the radio spectrum dynamically allocated to the base station by the spectrum information management server, and initiate transmission of the spectrum information from the base station toward one or more wireless clients via one or more of the spectrum information channels.

2. The base station of claim 1, wherein the communication services comprise at least one of voice services or data services.

3. The base station of claim 1, wherein the processor is configured to receive the configuration information from the radio access network manager.

4. The base station of claim 3, wherein the processor is configured to:
propagate, toward the radio access network manager, at least one base station characteristic of the base station.

5. The base station of claim 4, wherein the at least one base station characteristic of the base station comprises at least one of a current base station load of the base station, a base station power usage of the base station, or an available base station power of the base station.

6. The base station of claim 1, wherein the processor is configured to receive the configuration information via a spectrum lease information protocol.

7. The base station of claim 1, wherein the configuration information comprises at least one of a set of frequency bands of spectrum allocated as part of the spectrum lease, a transmission power to be used for wireless transmissions by the base station, or a type of waveform to be used for wireless transmissions by the base station.

8. The base station of claim 1, wherein the configuration information comprises one or more frequency bands of spectrum allocated as part of the spectrum lease, wherein the spectrum information comprises at least a portion of a spectrum map associated with the base station.

9. The base station of claim 1, wherein the processor is configured to receive the spectrum information via a spectrum information protocol.

10. The base station of claim 1, wherein the processor is configured to receive the spectrum information from the spectrum information management server.

11. The base station of claim 1, wherein the spectrum information comprises at least one of a spectrum map, a spectrum section boundary, a requester to which a spectrum section is allocated, a current waveform or network access method used, a time duration of an allocated spectrum portion, a maximum transmission power allowed, or an interference temperature.

12. The base station of claim 11, wherein the interference temperature defines an amount of interference or a total RF energy from ambient noise, thermal noise, and other sources of noise.

13. The base station of claim 1, wherein the spectrum lease comprises a lease of a portion of radio spectrum of a Coordinated Access Band (CAB) of radio spectrum available for dynamic allocation.

14. The base station of claim 13, wherein the set of spectrum information channels comprises one or more spectrum information channels defined within the CAB.

15. The base station of claim 13, wherein the set of spectrum information channels comprises one or more spectrum information channels defined outside of the CAB.

16. The base station of claim 13, wherein the CAB comprises at least one of radio frequency bands adjacent to current cellular bands, PCS bands, or unused broadcast TV channels.

17. The base station of claim 1, wherein the processor is configured to:
based on a determination that at least one adaptive cognitive radio of the base station has been configured based on the configuration information:
register, with the spectrum information management server, use by the base station of the radio spectrum allocated to the base station in the spectrum lease.

18. The base station of claim 1, wherein the processor is configured to:

record spectrum usage information associated with use of spectrum available from the base station; and
propagate the spectrum usage information toward the spectrum information management server.

19. The base station of claim 18, wherein the spectrum usage information comprises at least one of:
for a portion of radio spectrum available from the base station, a number of clients using the portion of radio spectrum;
per-client geolocation information;
a temporal snapshot of respective interference temperatures; or
a signal-to-noise ratio for a current wireless access channel.

20. The base station of claim 1, wherein the processor is configured to:
based on a determination that the spectrum lease has expired and the base station has not received a spectrum lease renewal notification:
disable one or more adaptive cognitive radios associated with the spectrum lease;
notify the spectrum information management server of deallocation of the radio spectrum of the spectrum lease; and
modify the spectrum information transmitted from the base station via the set of spectrum information channels.

21. The base station of claim 1, wherein the configuration information is received from the radio access network manager responsive to determination of the configuration information by the radio access network manager based on spectrum lease information for the spectrum lease that is received by the radio access network manager from the spectrum information management server, wherein the spectrum information is received from at least one of the spectrum information management server or the radio access network manager.

22. The base station of claim 1, wherein at least one of the adaptive cognitive radios is configured for at least one of:
maintaining knowledge of spectrum usage as a function of location and time;
maintaining one or more rules for sharing available spectrum with respect to one or more of time, frequency, or space; or
determining a set of transmission parameters based on user behavior.

23. A method for use by a base station, the method comprising:
receiving, at the base station via a processor, configuration information determined by a radio access network manager and comprising one or more configuration parameters for configuring one or more adaptive cognitive radios of a set of adaptive cognitive radios of the base station based on a spectrum lease of radio spectrum dynamically allocated to the base station by a spectrum information management server, wherein the set of adaptive cognitive radios of the base station is configured to provide access channels for supporting communication services for wireless clients and is configured to provide a set of spectrum information channels for sharing of spectrum information with wireless clients;
configuring one or more of the adaptive cognitive radios of the base station based on the received configuration information;
receiving spectrum information determined by the spectrum information management server and comprising one or more spectrum parameters describing the radio spectrum dynamically allocated to the base station by the spectrum information management server; and
initiating transmission of the spectrum information from the base station toward one or more wireless clients via one or more of the spectrum information channels.

24. The method of claim 23, wherein the communication services comprise at least one of voice services or data services.

25. The method of claim 23, wherein the configuration information is received from the radio access network manager.

26. The method of claim 25, further comprising:
propagating, toward the radio access network manager, at least one base station characteristic of the base station.

27. The method of claim 26, wherein the at least one base station characteristic of the base station comprises at least one of a current base station load of the base station, a base station power usage of the base station, or an available base station power of the base station.

28. The method of claim 23, wherein the configuration information is received via a spectrum lease information protocol.

29. The method of claim 23, wherein the configuration information comprises at least one of a set of frequency bands of spectrum allocated as part of the spectrum lease, a transmission power to be used for wireless transmissions by the base station, or a type of waveform to be used for wireless transmissions by the base station.

30. The method of claim 23, wherein the configuration information comprises one or more frequency bands of spectrum allocated as part of the spectrum lease, wherein the spectrum information comprises at least a portion of a spectrum map associated with the base station.

31. The method of claim 23, wherein the spectrum information is received via a spectrum information protocol.

32. The method of claim 23, wherein the spectrum information is received from the spectrum information management server.

33. The method of claim 23, wherein the spectrum information comprises at least one of a spectrum map, a spectrum section boundary, a requester to which a spectrum section is allocated, a current waveform or network access method used, a time duration of an allocated spectrum portion, a maximum transmission power allowed, or an interference temperature.

34. The method of claim 33, wherein the interference temperature defines an amount of interference or a total RF energy from ambient noise, thermal noise, and other sources of noise.

35. The method of claim 23, wherein the spectrum lease comprises a lease of a portion of radio spectrum of a Coordinated Access Band (CAB) of radio spectrum available for dynamic allocation.

36. The method of claim 35, wherein the set of spectrum information channels comprises one or more spectrum information channels defined within the CAB.

37. The method of claim 35, wherein the set of spectrum information channels comprises one or more spectrum information channels defined outside of the CAB.

38. The method of claim 35, wherein the CAB comprises at least one of radio frequency bands adjacent to current cellular bands, PCS bands, or unused broadcast TV channels.

39. The method of claim 23, further comprising:
based on a determination that at least one adaptive cognitive radio of the base station has been configured based on the configuration information:

registering, with the spectrum information management server, use by the base station of the radio spectrum allocated to the base station in the spectrum lease.

40. The method of claim 23, further comprising:
recording spectrum usage information associated with use of spectrum available from the base station; and
propagating the spectrum usage information toward the spectrum information management server.

41. The method of claim 40, wherein the spectrum usage information comprises at least one of:
for a portion of radio spectrum available from the base station, a number of clients using the portion of radio spectrum;
per-client geolocation information;
a temporal snapshot of respective interference temperatures; or
a signal-to-noise ratio for a current wireless access channel.

42. The method of claim 23, further comprising:
based on a determination that the spectrum lease has expired and the base station has not received a spectrum lease renewal notification:
disabling one or more adaptive cognitive radios associated with the spectrum lease;
notifying the spectrum information management server of deallocation of the radio spectrum of the spectrum lease; and
modifying the spectrum information transmitted from the base station via the set of spectrum information channels.

43. The method of claim 23, wherein the configuration information is received from the radio access network manager responsive to determination of the configuration information by the radio access network manager based on spectrum lease information for the spectrum lease that is received by the radio access network manager from the spectrum information management server, wherein the spectrum information is received from at least one of the spectrum information management server or the radio access network manager.

44. The method of claim 23, wherein at least one of the adaptive cognitive radios is configured for at least one of:
maintaining knowledge of spectrum usage as a function of location and time;
maintaining one or more rules for sharing available spectrum with respect to one or more of time, frequency, or space; or
determining a set of transmission parameters based on user behavior.

* * * * *